US012361058B2

(12) United States Patent
Benson et al.

(10) Patent No.: US 12,361,058 B2
(45) Date of Patent: Jul. 15, 2025

(54) FILE FORMAT FOR SELECTIVE STREAMING OF DATA

(71) Applicant: EMBARK TRUCKS INC., San Francisco, CA (US)

(72) Inventors: Liam Benson, San Francisco, CA (US); Kashish Jain, San Francisco, CA (US); Caleb Foust, San Francisco, CA (US); Brendan Geck, San Francisco, CA (US)

(73) Assignee: EMBARK TRUCKS INC., San Francisco, CA (US)

( * ) Notice: Subject to any disclaimer, the term of this patent is extended or adjusted under 35 U.S.C. 154(b) by 85 days.

(21) Appl. No.: 18/124,817

(22) Filed: Mar. 22, 2023

(65) Prior Publication Data
US 2024/0320265 A1    Sep. 26, 2024

(51) Int. Cl.
G06F 16/73    (2019.01)
G06F 16/71    (2019.01)
G06F 16/738   (2019.01)

(52) U.S. Cl.
CPC ......... *G06F 16/739* (2019.01); *G06F 16/71* (2019.01)

(58) Field of Classification Search
CPC .............................. G06F 16/739; G06F 16/71
See application file for complete search history.

(56) References Cited

U.S. PATENT DOCUMENTS

| | | | |
|---|---|---|---|
| 2011/0238789 A1* | 9/2011 | Luby | H04N 21/234327 709/219 |
| 2023/0016578 A1* | 1/2023 | Williams | G01C 21/3863 |
| 2024/0004779 A1* | 1/2024 | Benson | G06F 11/3684 |

OTHER PUBLICATIONS

Extended European Search Report for European Patent Application No. 24164974.8, dated Jul. 2, 2024 (6 pages).

* cited by examiner

*Primary Examiner* — Mishawn N. Hunter
(74) *Attorney, Agent, or Firm* — McDermott Will & Emery LLP

(57) ABSTRACT

Provided are systems and methods for selectively streaming content using a new binary file format. In one example, a method may include storing a plurality of binary files, establishing a network communication session between the computing system and a computing terminal via a network, receiving identifiers of one or more intervals of time from the computing terminal via the network communication session, identifying a subset of data within a data section of a binary file stored in memory which is mapped to the identifiers of the one or more intervals of time based on an index within the binary file, and transmitting a stream including the identified subset of data to the computing terminal via the network communication session.

18 Claims, 15 Drawing Sheets

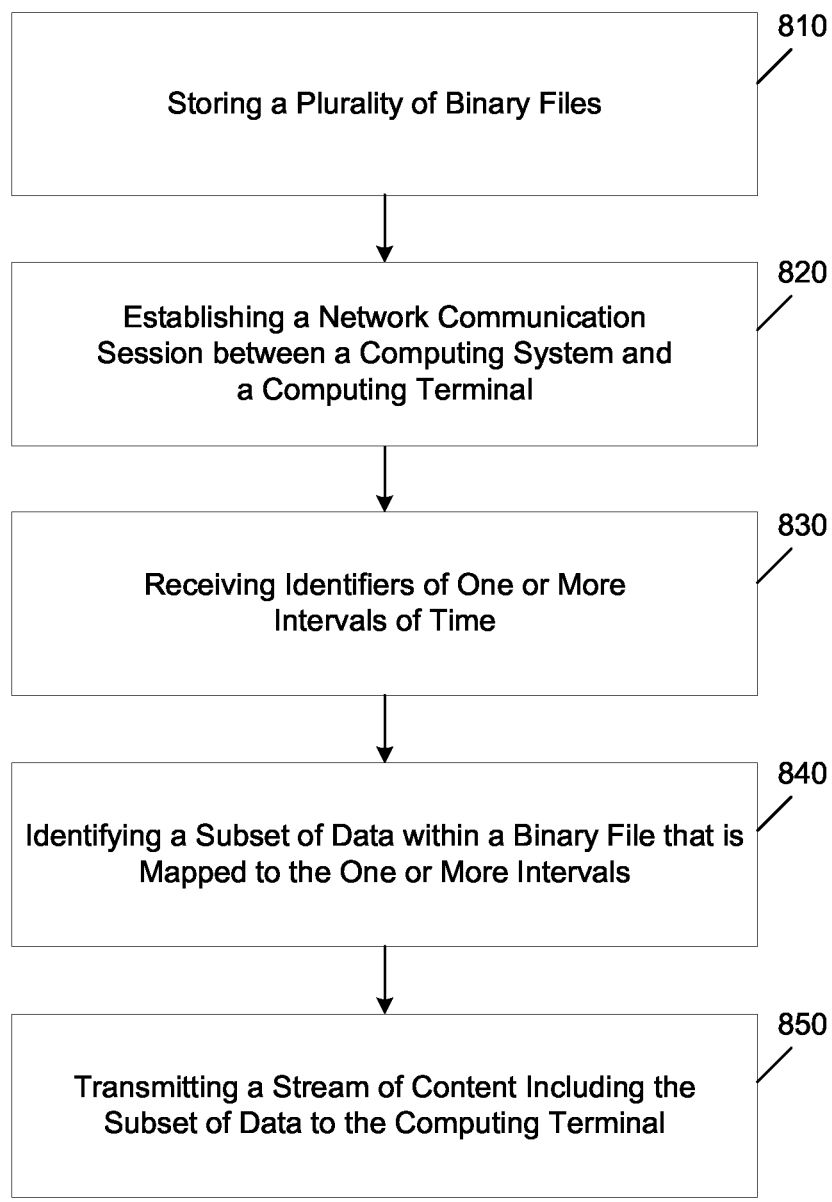

FILE FORMAT FOR SELECTIVE STREAMING OF DATA

BACKGROUND

Autonomous driving systems, such as those found in vehicles, trucks, and other types of autonomous transports, rely on simulation software. For example, the simulation software may be used to develop, train, and validate the autonomous driving systems. Many simulation systems use driving data captured by a vehicle during a trip such as camera data, lidar data, GPS data, routing data, the decisions made by the autonomous driving systems, and the like. The data may be captured while the vehicle is driving along route and then used by the simulation system to test additional runs of the vehicle through software without requiring the vehicle to go back to the road.

A robotic operating system (ROS) file referred to as a "bag" or "ROS bag" is one of the most common types of files that are used to store driving data. Messages captured by different systems on a vehicle can be stored together as chunks of data within the bag file. However, in order to selectively play data from the bag file (such as only a small portion of a video file stored therein), the entire bag file must be opened and downloaded to the streaming device. This consumes a significant amount of time and bandwidth considering the user device is only interested in playing a small portion of the file. Accordingly, what is needed is a better file format for streaming content.

SUMMARY

The example embodiments are directed to a new type of file format referred to herein as a "pocket" file. A pocket file is a binary file that includes an indexed data section storing simulation content such as multimedia content, video content, audio content, images, GPS content, route data, planning data, and the like. Within the pocket file is a header with an index stored therein that can be used to quickly identify small pieces of data (pockets) within the data section of the pocket file. For example, small pockets of data within the data section can be identified by loading only the index (or the header) from the pocket file without having to load the data section as well. Thus, a server or a requesting terminal can quickly find the desired intervals of data and request those intervals of data from the host platform. In response, the hots platform may selectively download/stream only those selected pockets of data rather than the entire data section. Thus, the amount of data being loaded and streamed is significantly reduced by the example embodiments.

As an example, the index can be generated based on intervals of time within the multimedia content stored within the data section. For example, a new interval of time can be stored in the index every second, half second, quarter of a second, etc. The index is a mapping of intervals of time to byte locations within the data section corresponding to the data that was captured. Thus, the data can be selectively identified (and played/streamed) based on its point in time within the content without streaming the entire file. Another benefit is that the host system can "jump" over other data sections at other intervals of time when playing back the multimedia content. For example, when the host platform receives two non-consecutive intervals of time from a requesting terminal, the host platform can skip or otherwise avoid playing content from points in time within the file corresponding to the intermediate intervals of multimedia content between the non-consecutive intervals of time within the multimedia content.

According to an example embodiment, provided is a memory configured to store a plurality of binary files, and a processor configured to establish a network communication session between the computing system and a computing terminal via a network, receive identifiers of one or more intervals of time from the computing terminal via the network communication session, identify a subset of data within a data section of a binary file stored in memory which is mapped to the identifiers of the one or more intervals of time based on an index within the binary file, and transmit a stream including the identified subset of data to the computing terminal via the network communication session.

According to another example embodiment, provided is storing a plurality of binary files, establishing a network communication session between the computing system and a computing terminal via a network, receiving identifiers of one or more intervals of time from the computing terminal via the network communication session, identifying a subset of data within a data section of a binary file stored in memory which is mapped to the identifiers of the one or more intervals of time based on an index within the binary file, and transmitting a stream including the identified subset of data to the computing terminal via the network communication session.

According to another example embodiment, provided is a non-transitory computer-readable medium that includes instructions which when executed by a processor cause a computer to perform a method that includes storing a plurality of binary files, establishing a network communication session between the computing system and a computing terminal via a network, receiving identifiers of one or more intervals of time from the computing terminal via the network communication session, identifying a subset of data within a data section of a binary file stored in memory which is mapped to the identifiers of the one or more intervals of time based on an index within the binary file, and transmitting a stream including the identified subset of data to the computing terminal via the network communication session.

BRIEF DESCRIPTION OF THE DRAWINGS

Features and advantages of the example embodiments, and the manner in which the same are accomplished, will become more readily apparent with reference to the following detailed description taken in conjunction with the accompanying drawings.

FIG. 8 is a diagram illustrating a method of selectively streaming content from a binary file in accordance with example embodiments.

Figure 1:
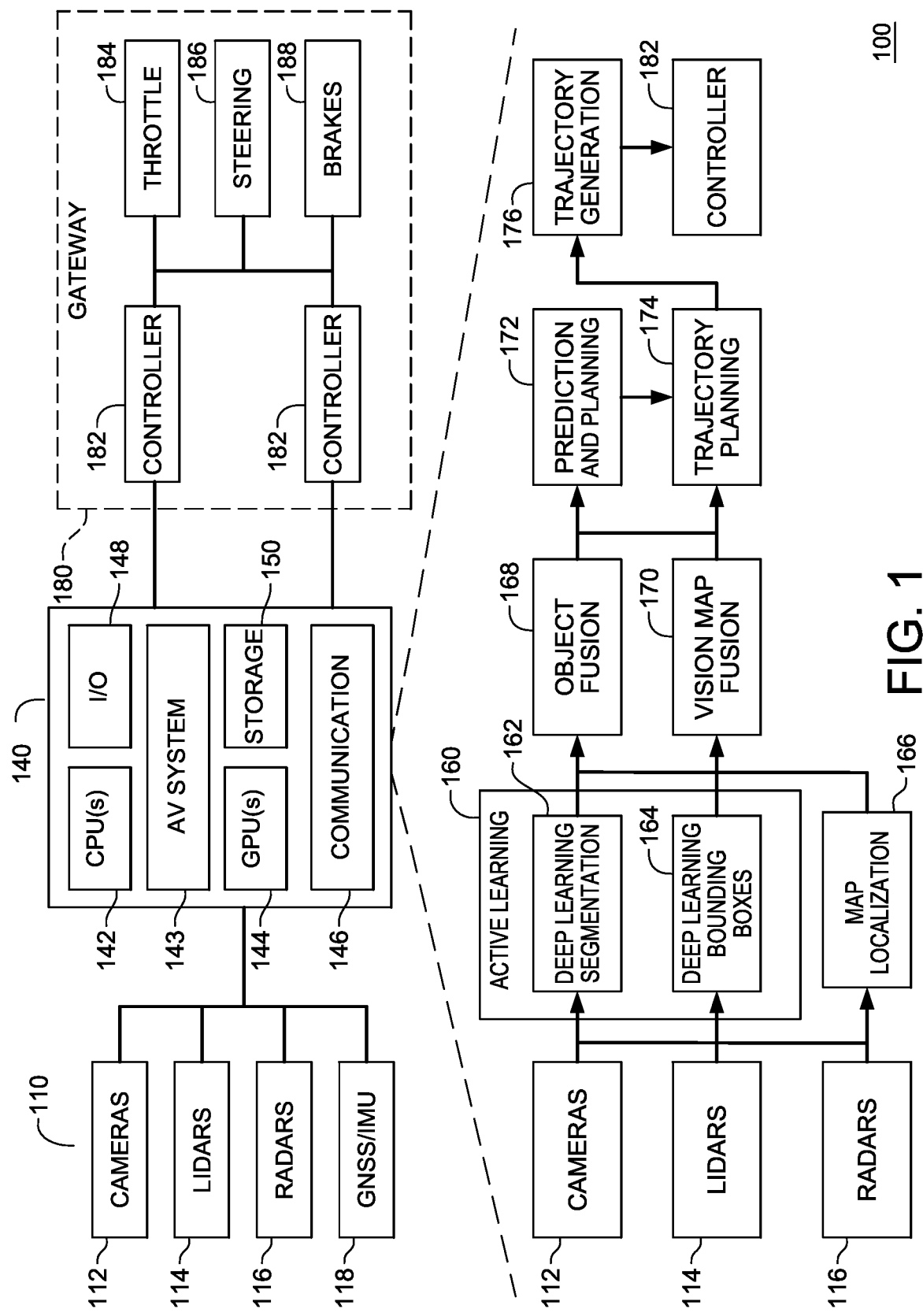
FIG. 1 is a diagram illustrating a control system that may be deployed in a vehicle such as the semi-truck depicted in FIGS. 2A-2C, in accordance with an example embodiment.

Throughout the drawings and the detailed description, unless otherwise described, the same drawing reference numerals will be understood to refer to the same elements, features, and structures. The relative size and depiction of these elements may be exaggerated or adjusted for clarity, illustration, and/or convenience.

DETAILED DESCRIPTION

In the following description, specific details are set forth in order to provide a thorough understanding of the various example embodiments. It should be appreciated that various modifications to the embodiments will be readily apparent to those skilled in the art, and the generic principles defined herein may be applied to other embodiments and applications without departing from the spirit and scope of the disclosure. Moreover, in the following description, numerous details are set forth for the purpose of explanation. However, one of ordinary skill in the art should understand that embodiments may be practiced without the use of these specific details. In other instances, well-known structures and processes are not shown or described in order not to obscure the description with unnecessary detail. Thus, the present disclosure is not intended to be limited to the embodiments shown, but is to be accorded the widest scope consistent with the principles and features disclosed herein.

The example embodiments are directed to a new type of file format that can be used to more efficiently process a streaming session between a host system (such as a cloud platform or other content delivery platform) and a user device or other computing terminal that is downloading and playing/streaming the content. The file format is a binary file format with an indexed data section. The indexing is based on units of time within the playable content stored in the indexed data section. For example, the content played at a first interval of time within the video (e.g., first second of time) and the content played at a next interval of time in the video (e.g., the next second, etc.) may be separately identified in the index and can thus be selectively extracted and played during a streaming session without needing to load the entire data section.

In some embodiments, the streaming platform described herein can be used to host a streaming service for autonomous vehicle development. The streaming service can be called by a simulation software that is simulating a driving environment for a vehicle. For example, the simulation software may play actual driving data captured from a vehicle against software that is being developed for the vehicle to test the software for bugs and fixes. The pocket files described herein may store multiple types of data that can be used for a vehicle simulation such as GPS data, imaging data, routing data, planning data, and the like. All of this data may be indexed and quickly pulled together without needing to open the entire file because of the index stored in the header. Instead, a user just needs to open the header to identify which portions of the file they would like to use during a test simulation. The user can also "jump" between intervals in the multimedia content stored in the file based on the index.

For convenience and ease of exposition, a number of terms will be used herein. For example, the term "semi-truck" will be used to refer to a vehicle in which systems of the example embodiments may be used. The terms "semi-truck", "truck", "tractor", "vehicle" and "semi" may be used interchangeably herein. It should also be appreciated that the example embodiments are not limited to autonomous semi-trucks, but rather, all types of vehicles, trucks, vans, motorcycles, and the like, which may travel along a road.

Light detection and ranging (lidar) sensors are used by vehicles to measure a surrounding area by obtaining a sparse point cloud using distances to points in the point cloud that are measured by light beams from the lidar sensors. The illumination works independently from ambient light and can be used in any conditions. Furthermore, the lidar sensors can capture data that can be used to generate a map of the world in three-dimensions (3D). Radio detection and ranging (radar) sensors are used by vehicles to identify objects and other obstacles around the vehicle. The radar sensors may emit electromagnetic waves that reflect (and return reflected waves) when they meet the obstacle. Meanwhile, vehicle cameras can capture images (e.g., RGB images, black and white images, etc.) of the world around the vehicle and provide complimentary data to the lidar data captured by the lidar sensors. For example, cameras can capture data such as color, texture, appearance, etc., while lidar is able to capture and model structural aspects of the data. The lidar sensors, radar sensors, and cameras are exemplary sensors in a vehicle as described herein such as an autonomous vehicle (AV).

In many vehicles, the perception of the vehicle is created based on a combination (i.e., jointly) of lidar data from the lidar sensors and image data captured by the cameras. For accurate perception, these two systems must be aligned with respect to each other. Calibration can be performed to align a coordinate frame of a lidar sensor(s) with a coordinate frame of a camera by changing extrinsic parameters such as rotation and translation between the coordinate frames of the lidar sensor and the camera. These extrinsic parameters can be used to fuse information together from the lidar sensors and the image sensors when visualizing the vehicle interprets visual data from the road.

With the calibrated sensors, the vehicle can capture images and lidar readings of the area surrounding the vehicle and build/modify a three-dimensional map that is stored internally within a computer of the vehicle (or remotely via a web server). The vehicle can localize itself within the map and make decisions on how to steer, turn, slow down, etc. based on other objects, lane lines, entrance lanes, exit lanes, etc. within the map. Autonomous vehicles may use one or more computer systems to control the vehicle to move autonomously without user input. For example, the vehicle may be equipped with an autonomous vehicle (AV) system that generates signals for controlling the engine, the steering wheel, the brakes, and the like, based on other objects, lane lines, entrance lanes, and exit lanes, within the map.

According to various embodiments, driving data may be captured by a vehicle travelling down the road and stored using a first type of file, for example, a robotic operating system (ROS) file also known as a "bag" file. Within a ROS bag, data captured by the vehicle is not indexed. Instead, the data is stored as "chunks" without any indexing. The data can include a mixture of multiple types of data including GPS data, imaging data, lidar data, radar data, routing and planning system data, map data, and the like. The chunk is then encoded and metadata is added to the file to identify the chunk. In order for the content (e.g., the video, etc.) stored in the chunk to be played, the entire ROS bag file must be downloaded to the client device and opened. If the client just wants to view a small portion of the video, then this process is every inefficient because they must download the entire file.

In contrast, in the present application, a pocket file is provided and enables the host platform to download only selective pieces of video (and other multimedia content) from a data section of the file to the client without downloading the entire data section of the file to the client. Thus, the client does not need to wait for the entire download to occur or open the entire file on their local system. Instead, the client can download an index of the pocket file (which is stored in a header of the pocket file), and select the portion or portions of the video of interest (e.g., by time intervals). In response, the host platform can download only those selected portions of video from the data section of the file using the index.

In other words, for the selected content to be played, only a small portion of the data section of the pocket file must be downloaded to the client device and opened. If the client just wants to view a small portion of the video, then this process is very efficient because they download only a small portion of the video and watch it. While video is used in this example, other types of time-based data can be retrieved such as sensor data captured by sensors on the vehicle which are associated with one or more of an engine, braking system, steering system, or the like. Other examples of data include route planning and guidance data, and the like. They can also jump from one portion of the video, over one or more intermediate portions of the video, to a non-consecutive portion of the video without having to download the intervening portion of the video. Accordingly, based on the indexed data section of the pocket file, the host platform/streaming service can reduce the amount of data that is downloaded in comparison to a traditional streaming service that uses ROS files. This also improves the bandwidth of the host platform and the network in general.

As an example, the client may include a client application with a buffer that enables the client application to request subsets of content from a file such as using hypertext transfer protocol (HTTP) range requests. The HTTP range request from the client application may identify an interval or range of time (but not all time) within the file. Here, the server can respond to the HTTP range request with just the content from that interval of time in the file.

Figure 2A:
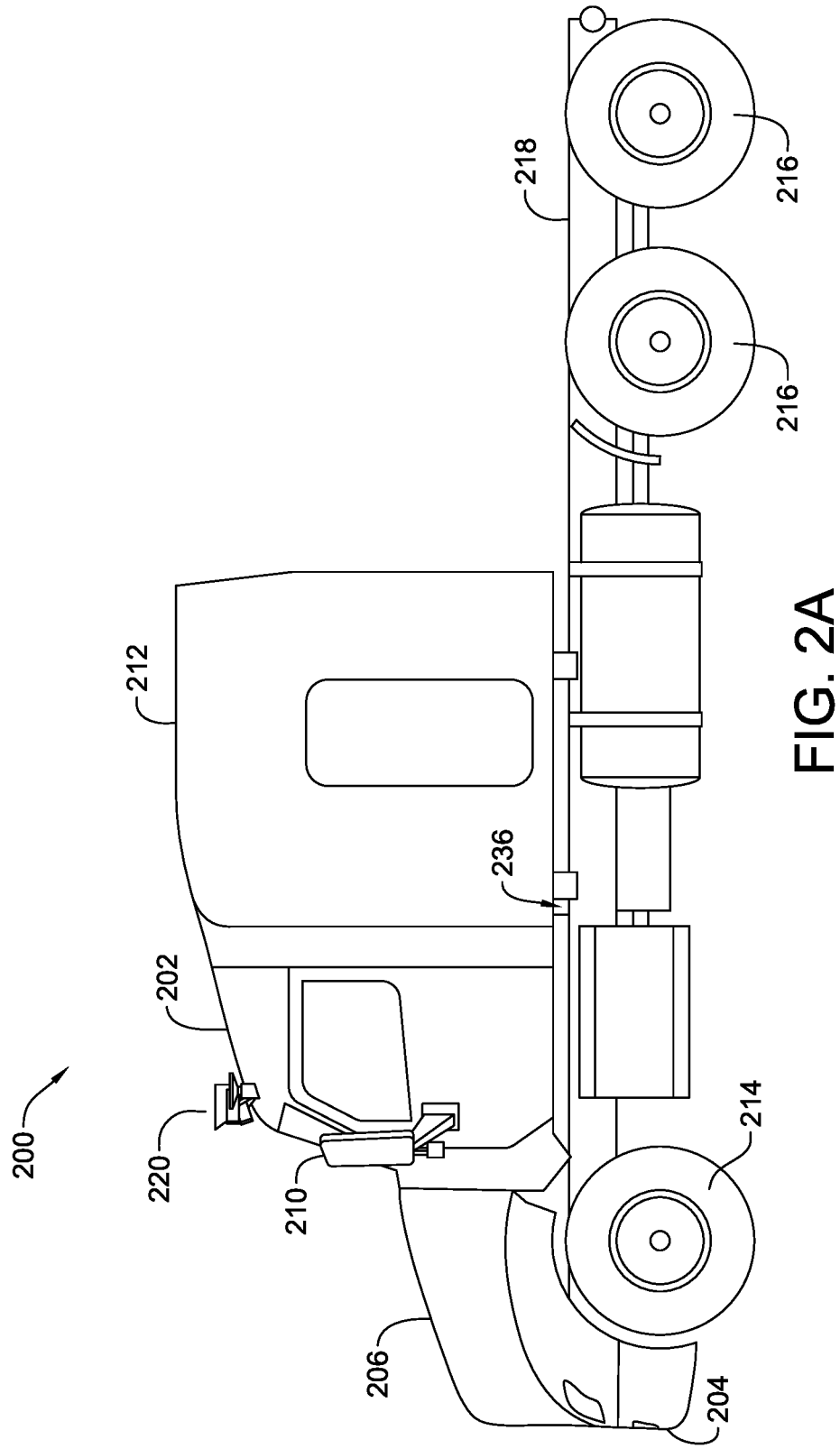
FIGS. 2A-2C are diagrams illustrating exterior views of a semi-truck that may be used in accordance with example embodiments.
Figure 2B:
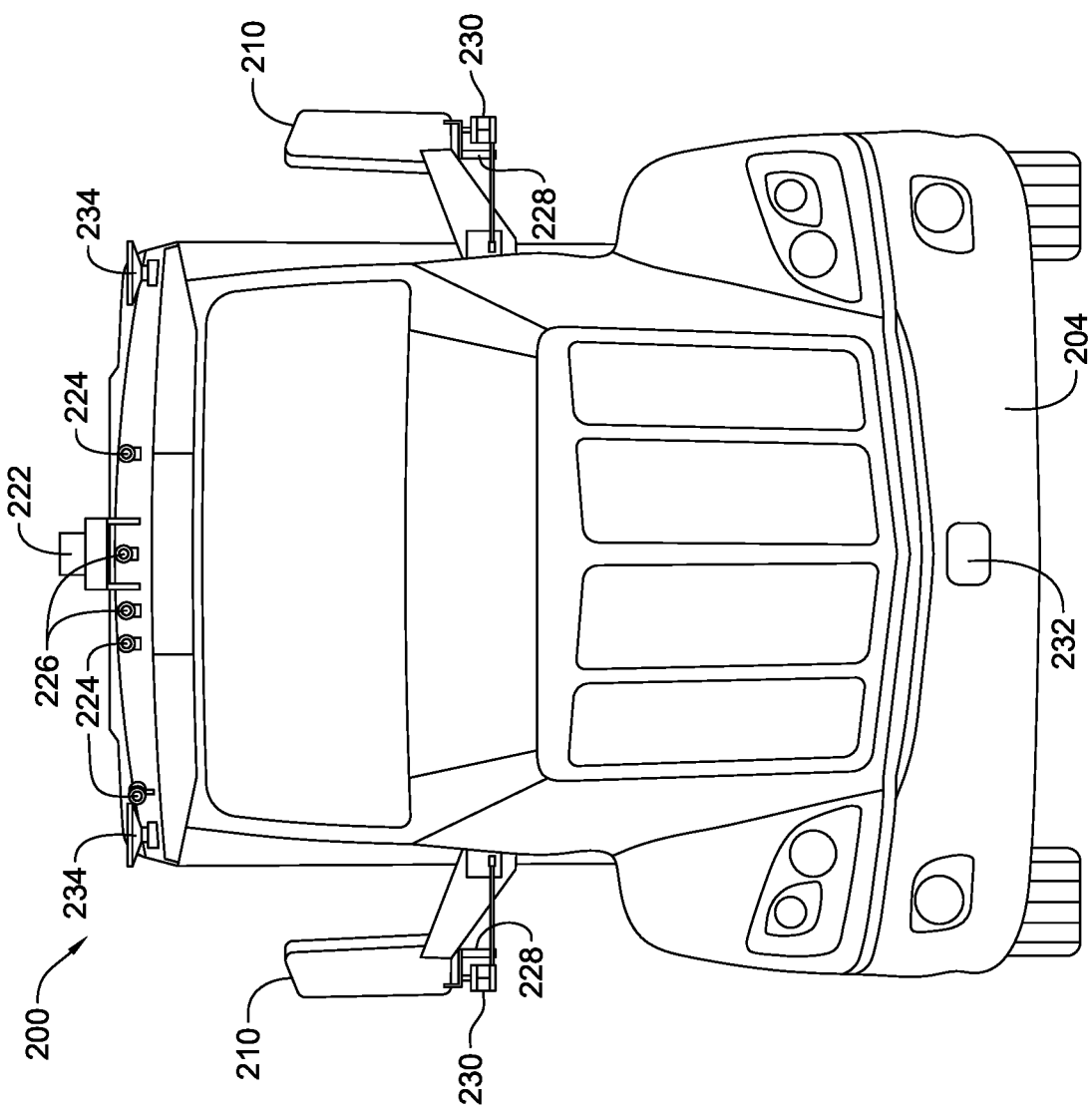
Figure 2C:
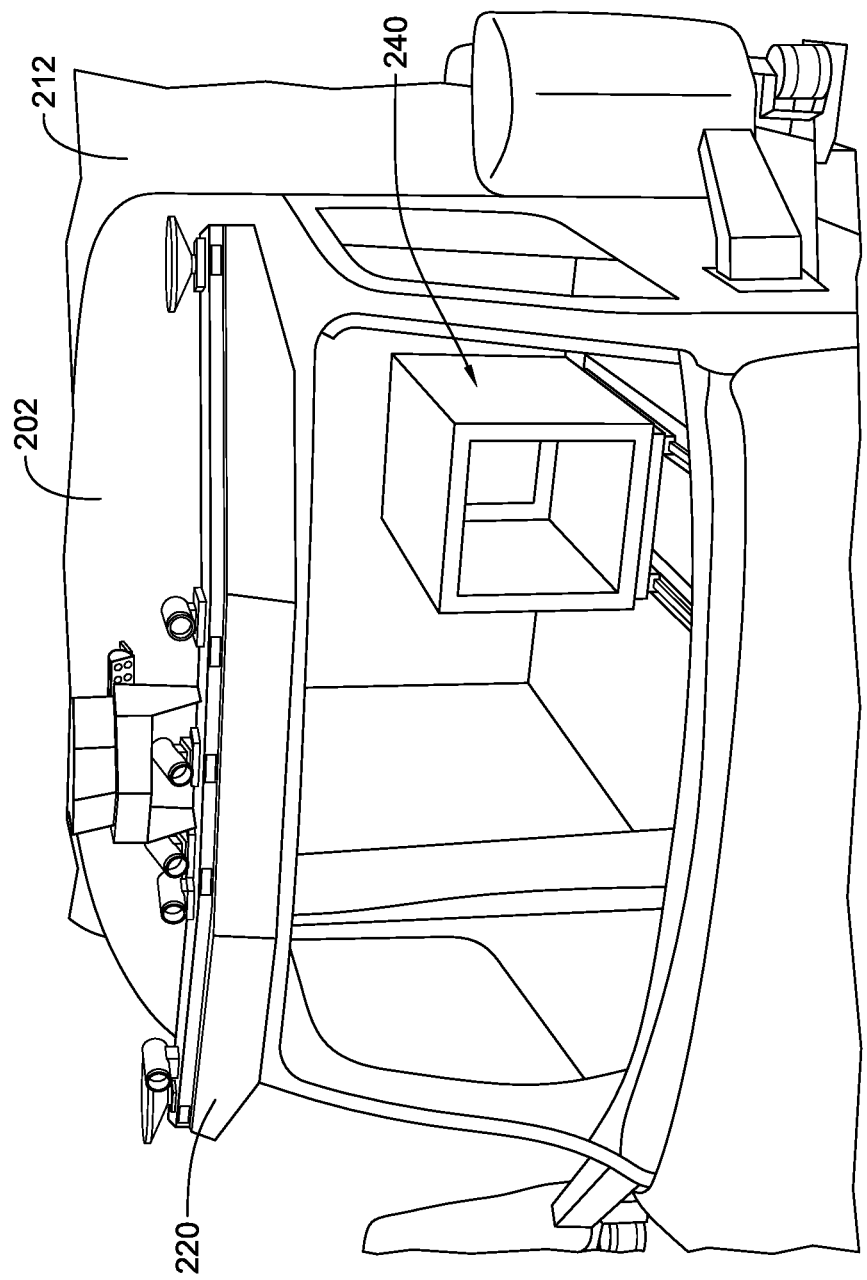

FIG. 1 illustrates a control system 100 that may be deployed in a vehicle such as the semi-truck 200 depicted in FIGS. 2A-2C, in accordance with an example embodiment. Referring to FIG. 1, the control system 100 may include a number of sensors 110 which collect data and information provided to a computer system 140 to perform operations including, for example, control operations which control components of the vehicle via a gateway 180. Pursuant to some embodiments, the gateway 180 is configured to allow the computer system 140 to control a number of different components from different manufacturers.

The computer system 140 may be configured with one or more central processing units (CPUs) 142 to perform processing including processing to implement features of embodiments of the present invention as described elsewhere herein as well as to receive sensor data from sensors 110 for use in generating control signals to control one or more actuators or other controllers associated with systems of the vehicle (including, for example, actuators or controllers allowing control of a throttle 184, steering systems 186, brakes 188 or the like). In general, the control system 100 may be configured to operate the semi-truck 200 in an autonomous (or semi-autonomous) mode of operation. In some embodiments, the computer system 140 may include an AV system 143 for controlling the system. For example, the AV system 143 may be installed within the computer system 140.

In operation, the control system 100 may be operated to capture images from one or more cameras 112 mounted on various locations of the semi-truck 200 and perform processing (such as image processing) on those images to identify objects proximate or in a path of the semi-truck 200. Further, lidar 114 and radar 116 may be positioned to sense or detect the presence and volume of objects proximate or in the path of the semi-truck 200. Other sensors may also be positioned or mounted on various locations of the semi-truck 200 to capture other information such as position data. For example, the sensors may include one or more satellite positioning sensors and/or inertial navigation systems such as GNSS/IMU sensors 118. A Global Navigation Satellite System (GNSS) is a space-based system of satellites that provide the location information (longitude, latitude, altitude) and time information in all weather conditions, anywhere on or near the Earth to devices called GNSS receivers. GPS is the world's most used GNSS system. An inertial measurement unit ("IMU") is an inertial navigation system. In general, an inertial navigation system ("INS") measures and integrates orientation, position, velocities, and accelerations of a moving object. An INS integrates the measured data, where a GNSS is used as a correction to the integration error of the INS orientation calculation. Any number of different types of GNSS/IMU sensors 118 may be used in conjunction with features of the present invention. The data collected by each of these sensors may be processed by the computer system 140 to generate control signals that control the operation of the semi-truck 200. The images and location information may be processed to identify or detect objects around or in the path of the semi-truck 200 and control signals may be emitted to adjust the throttle 184, steering systems 186 or brakes 188 as needed to safely operate the semi-truck 200. While illustrative example sensors and actuators or vehicle systems are shown in FIG. 1, those skilled in the art, upon reading the present disclosure, will appreciate that other sensors, actuators or systems may also be used. For example, in some embodiments, actuators to allow control of the transmission of the semi-truck 200 may also be provided.

The control system 100 may include a computer system 140 (such as a computer server) which is configured to provide a computing environment in which one or more software or control applications (such as items 160-182) may be executed to perform the processing described herein. In some embodiments, the computer system 140 includes components which are deployed on a semi-truck 200 (e.g., they may be deployed in a systems rack 240 positioned within a sleeper compartment 212 as shown in FIG. 2C). The computer system 140 may be in communication with other computer systems (not shown) that may be remote from the semi-truck 200 (e.g., the computer systems may be in communication via a network connection).

In some examples, the computer system 140 may be implemented as a server. Furthermore, the computer system 140 may configured using any of a number of well-known computing systems, environments, and/or configurations such as, but not limited to, personal computer systems, cloud platforms, server computer systems, thin clients, thick clients, hand-held or laptop devices, tablets, smart phones, databases, multiprocessor systems, microprocessor-based systems, set top boxes, programmable consumer electronics, network PCs, minicomputer systems, mainframe computer systems, distributed cloud computing environments, and the like, which may include any of the above systems or devices, and the like.

A number of different software applications or components may be executed by the computer system 140 and the control system 100. For example, as shown, applications may be provided which perform active learning machine processing (active learning component 160) to process images captured by one or more cameras 112 and information obtained by lidar 114. For example, image data may be processed using deep learning segmentation models 162 to identify objects of interest in those images (such as, for example, other vehicles, construction signs, etc.). Lidar data may be processed by the machine learning applications 164 to draw or identify bounding boxes on image data to identify objects of interest located by the lidar sensors. Information output from the machine learning applications may be provided as inputs to object fusion 168 and vision map fusion 170 software components which may perform processing to predict the actions of other road users and to fuse local vehicle poses with global map geometry in real-time, enabling on-the-fly map corrections. The outputs from the machine learning applications may be supplemented with information from radar 116 and map localization 166 application data (as well as with positioning data). These applications allow the control system 100 to be less map reliant and more capable of handling a constantly changing road environment. Further, by correcting any map errors on the fly, the control system 100 can facilitate safer, more scalable and more efficient operations as compared to alternative map-centric approaches. Information is provided to prediction and planning application 172 which provides input to trajectory planning 174 components allowing a trajectory 176 to be generated in real time based on interactions and predicted interactions between the semi-truck 200 and other relevant vehicles in the environment. In some embodiments, for example, the control system 100 generates a sixty second planning horizon, analyzing relevant actors and available trajectories. The plan that best fits multiple criteria (including safety, comfort and route preferences) is selected and any relevant control inputs needed to implement the plan are provided to controllers 182 to control the movement of the semi-truck 200.

These applications or components (as well as other components or flows described herein) may be implemented in hardware, in a computer program executed by a processor, in firmware, or in a combination of the above. A computer program may be embodied on a computer readable medium, such as a storage medium or storage device. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

A storage medium may be coupled to the processor such that the processor may read information from, and write information to, the storage medium. In an alternative, the storage medium may be integral to the processor. The processor and the storage medium may reside in an application specific integrated circuit ("ASIC"). In an alternative, the processor and the storage medium may reside as discrete components. For example, FIG. 1 illustrates an example computer system 140 which may represent or be integrated in any of the above-described components, etc. FIG. 1 is not intended to suggest any limitation as to the scope of use or functionality of embodiments of the application described herein. The computer system 140 is capable of being implemented and/or performing any of the functionality set forth hereinabove.

The computer system 140 may be described in the general context of computer system-executable instructions, such as program modules, being executed by a computer system. Generally, program modules may include routines, programs, objects, components, logic, data structures, and so on that perform particular tasks or implement particular abstract data types. The computer system 140 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, the computer system 140 is shown in the form of a general-purpose computing device. The components of the computer system 140 may include, but are not limited to, one or more processors (such as CPUs 142 and GPUs 144), a communication interface 146, one or more input/output interfaces 148 and the storage device 216. Although not shown, the computer system 140 may also include a system bus that couples various system components including system memory to the CPUs 142. In some embodiments, the input/output interfaces 148 may also include a network interface. For example, in some embodiments, some or all of the components of the control system 100 may be in communication via a controller area network ("CAN") bus or the like.

The storage device 150 may include a variety of types and forms of computer readable media. Such media may be any available media that is accessible by computer system/server, and it may include both volatile and non-volatile media, removable and non-removable media. System memory, in one embodiment, implements the flow diagrams of the other figures. The system memory can include computer system readable media in the form of volatile memory, such as random-access memory (RAM) and/or cache memory. As another example, storage device 150 can read and write to a non-removable, non-volatile magnetic media (not shown and typically called a "hard drive"). Although not shown, the storage device 150 may include one or more removable non-volatile disk drives such as magnetic, tape or optical disk drives. In such instances, each can be connected to the bus by one or more data media interfaces. Storage device 150 may include at least one program product having a set (e.g., at least one) of program modules that are configured to carry out the functions of various embodiments of the application.

FIGS. 2A-2C are diagrams illustrating exterior views of a semi-truck 200 that may be used in accordance with example embodiments. Referring to FIGS. 2A-2C, the semi-truck 200 is shown for illustrative purposes only-those skilled in the art, upon reading the present disclosure, will appreciate that embodiments may be used in conjunction with a number of different types of vehicles. The example semi-truck 200 shown in FIGS. 2A-2C is one configured in a common North American style which has an engine 206 forward of a cab 202, a steering axle 214 and drive axles 216. A trailer (not shown) is attached to the semi-truck 200 via a fifth-wheel trailer coupling that is provided on a frame 218 positioned over the drive axles 216. A sleeper compartment 212 is positioned behind the cab 202. A number of sensors are positioned on different locations of the semi-truck 200. For example, sensors may be mounted on the roof of the cab 202 on a sensor rack 220. Sensors may also be mounted on side mirrors 210 as well as other locations.

As will be discussed, sensors may be mounted on the bumper 204 as well as on the side of the cab 202 or other locations. For example, a rear-facing radar 236 is shown as mounted on a side of the cab 202 in FIG. 2A. Embodiments may be used with other configurations of trucks or other vehicles (e.g., such as semi-trucks having a cab over or cab forward configuration or the like). In general, and without limiting embodiments of the present invention, features of the present invention may be used with desirable results in vehicles that carry cargo over long distances, such as long-haul semi-truck routes.

FIG. 2B is a front view of the semi-truck 200 and illustrates a number of sensors and sensor locations. The sensor rack 220 may secure and position several sensors including a long range lidar 222, long range cameras 224, GPS antennas 234, and mid-range front facing cameras 226. The side mirrors 210 may provide mounting locations for rear-facing cameras 228 and mid-range lidar 230. A front radar 232 may be mounted on the bumper 204. Other sensors may be mounted or installed on other locations—the locations and mounts depicted in FIGS. 2A-2C are for illustrative purposes only. Referring now to FIG. 2C, a partial view of the semi-truck 200 is shown which shows an interior of the cab 202 and the sleeper compartment 212. In some embodiments, portions of the control system 100 of FIG. 1 are deployed in a systems rack 240 in the sleeper compartment 212, allowing easy access to components of the control system 100 for maintenance and operation.

Figure 3A:
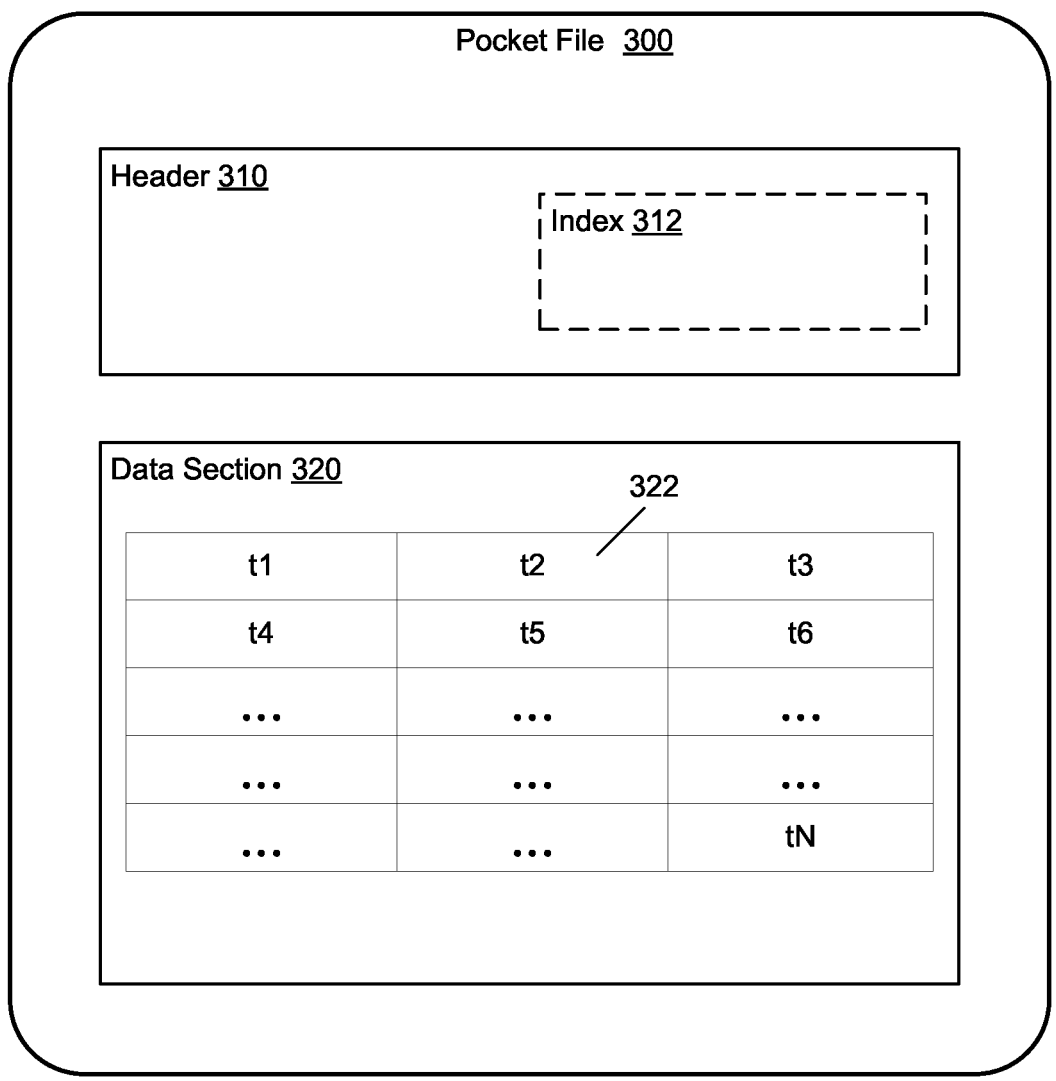
FIGS. 3A-3B are diagrams illustrating an example of a pocket file format in accordance with example embodiments.

FIG. 3A illustrates an example of a format of a pocket file 300 in accordance with example embodiments. Referring to FIG. 3A, the pocket file 300 is a binary file that includes a header 310 and a data section 320 that is indexed. The data section 320 may store multimedia content such as audio, image frames, GPS data, sensor data, lidar data, radar data, route guidance data, and the like. For example, the data section 320 may store playable content and the pocket file 300 may be played during a streaming session such as a driving simulation or any other kind of streaming session. The data or content may be stored in the form of messages.

Within a vehicle, the different systems such as GPS, engine, brake system, accelerator, control system, routing system, guidance system, planning system, etc., may publish messages to the vehicle's computer which are then stored in files. In some cases, the data may be stored in pocket files as described herein. As another example, the data may initially be stored in a non-indexed file such as a ROS file, and subsequently converted into a pocket file. An example of converting a ROS file into a pocket file is described in the examples of FIGS. 6A-6B.

Referring again to FIG. 3A, the indexing within the data section 320 may be based on intervals of time within the time-based data stored in the data section 320. For example, an index 312 may be created with a number of indices at equally-spaced apart intervals, for example, every 0.5 seconds, 1.0 seconds, 5.0 seconds, etc. Each interval of time within the index 312 may be mapped to a byte location 322 of corresponding data in the data section 320. The byte location 322 is an address or location within a storage structure of the data section 320. Here, the address that is mapped to the interval of time is where the data that is to be played at that interval of time is stored in the data section 320. Thus, the index 312 can be generated such that a plurality of time intervals are mapped to a plurality of byte locations within the data section 320 corresponding to a plurality of sections of the time-based data within the multimedia content.

Figure 3B:
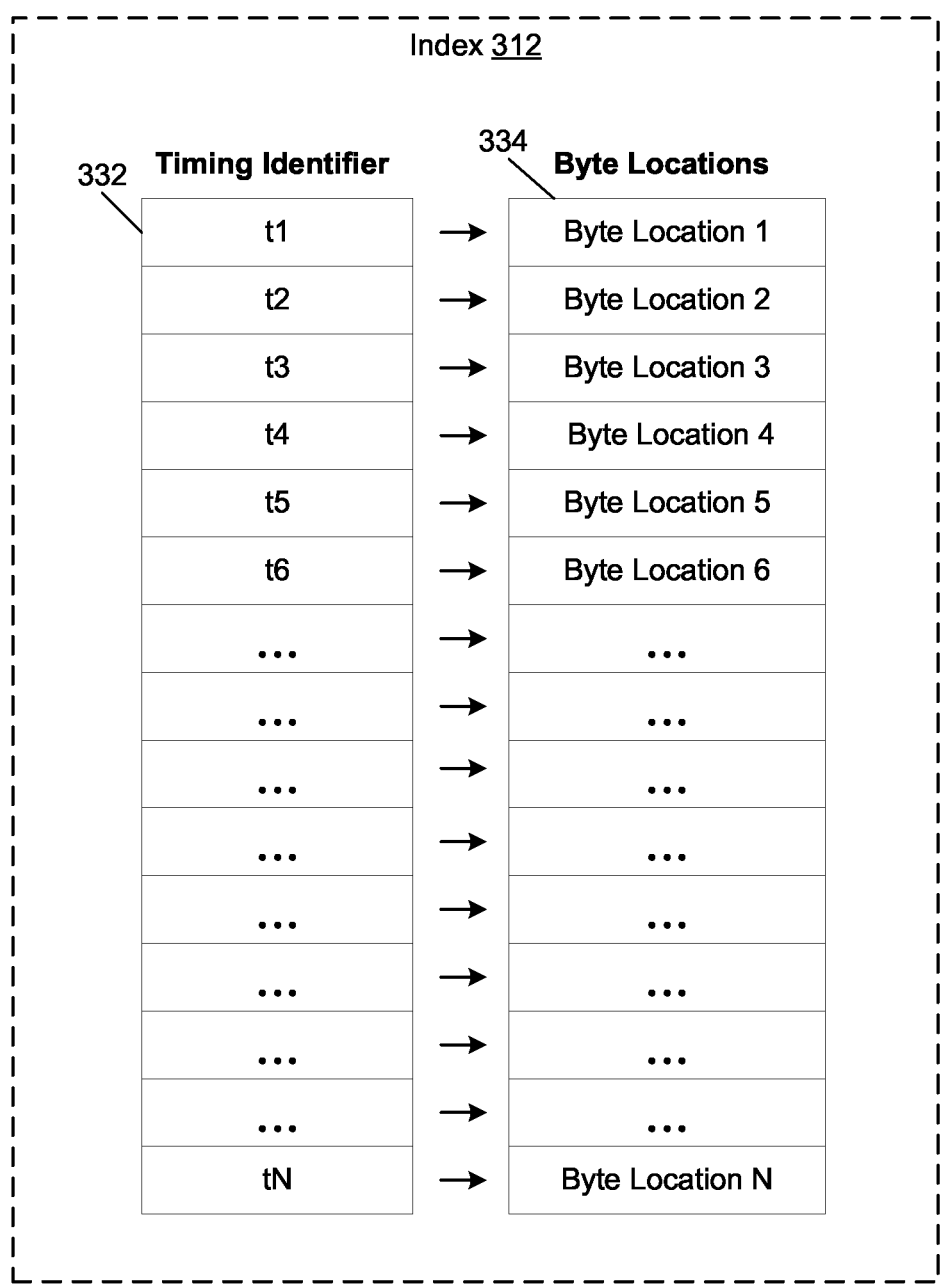

For example, FIG. 3B illustrates an additional example of the index 312 in accordance with an example embodiment. Referring to FIG. 3B, the index 312 includes a plurality of timing identifiers 332 (intervals of time) that are mapped to a plurality of byte locations 334 (addresses) in the data section 320 of the pocket file 300. In this example, the index 312 can store an indexed view of the multimedia content that is stored within the data section 320 based on time. Thus, the index 312 can be used to selectively identify subsets of content to be played from the data section 320 based on time.

Figure 4A:
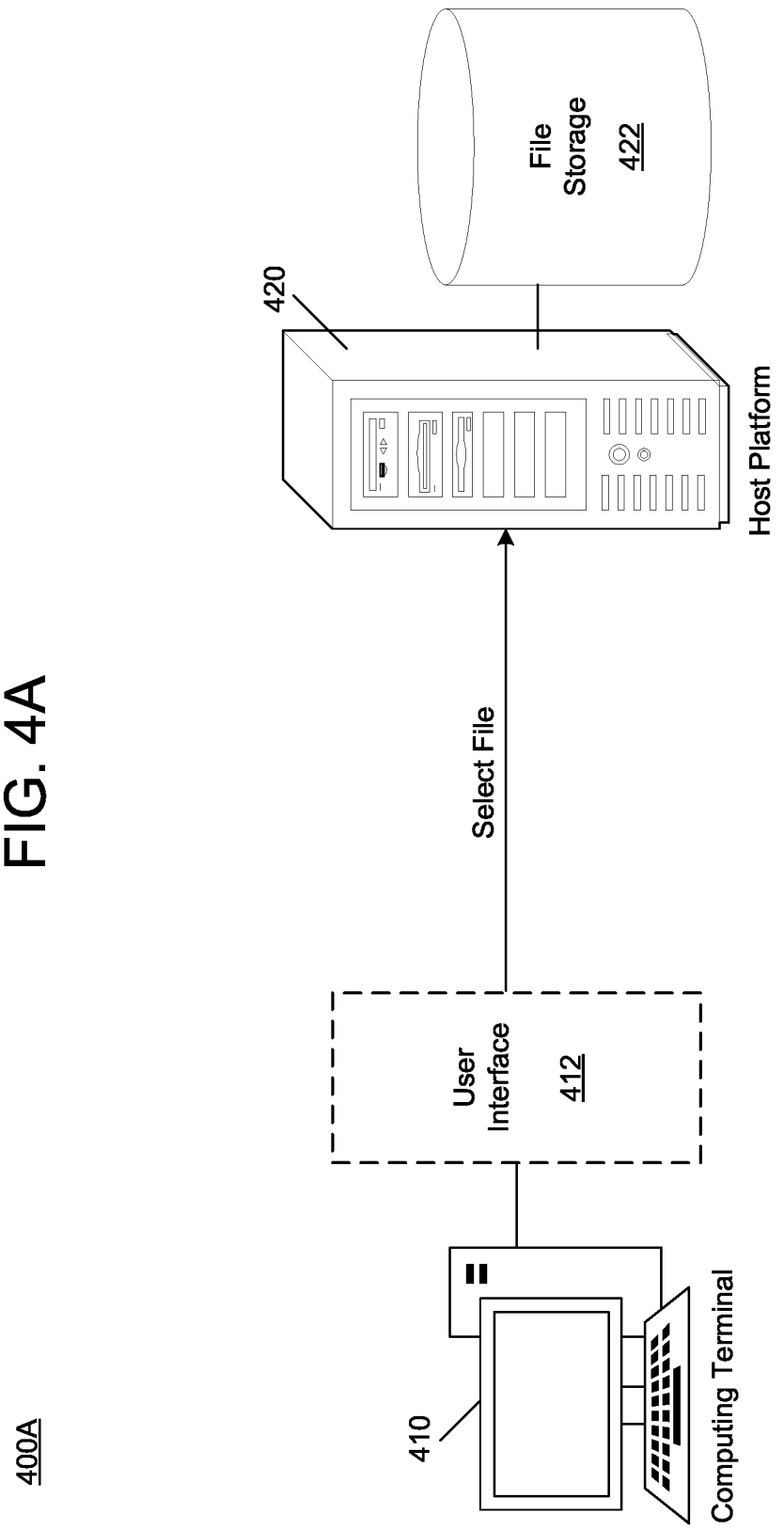
FIGS. 4A-4D are diagrams illustrating a process of streaming content based on a pocket file in accordance with an example embodiment.

FIGS. 4A-4D illustrate a process of streaming content based on a pocket file in accordance with an example embodiment. Referring to FIG. 4A, a process 400A is shown in which a computing terminal 410 establishes a network communication channel with a host platform 420 over a computer network such as the Internet and the like. The computing terminal 410 may be a desktop computer, a laptop computer, a tablet, a smart wearable, a mobile device, a vehicle, and the like. The host platform 420 may refer to any type of host system such as a cloud platform, a web server, a database, a content delivery service, and the like. The host platform 420 also includes a file storage 422 that stores files having a pocket file format as described in the examples of FIGS. 3A and 3B.

Figure 4B:
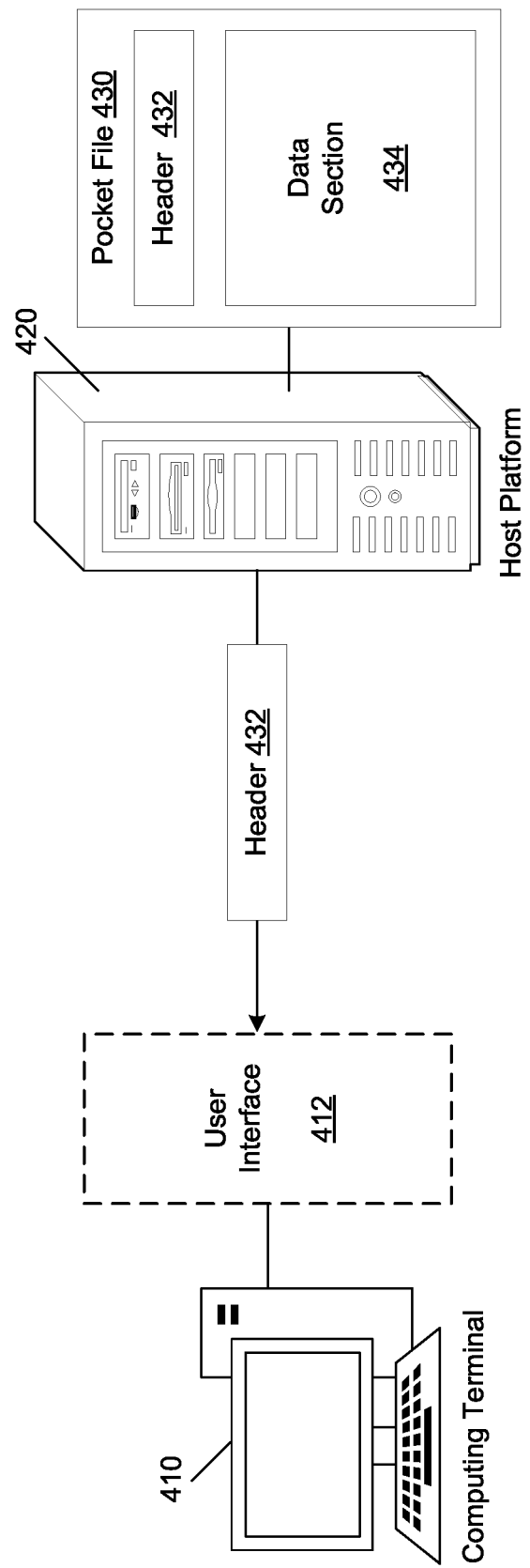

In the example of FIG. 4A, the user may open a user interface 412 which provides access to content that can be played. Initially, the user may identify a file that they wish to open and submit the selection to the host platform 420 via the user interface 412. In response, the host platform 420 may identify a pocket file 430 that corresponds to the file the user wishes to open from the file storage 422. For example, FIG. 4B illustrates a process 400B of the host platform 420 identifying the pocket file 430 and downloading only a header 432 from the pocket file 430 rather than the data section 434. The header 432 includes the index as discussed in the examples of FIGS. 3A and 3B, and provides an indexed view of the content stored within the data section 434 of the pocket file 430.

Figure 4C:
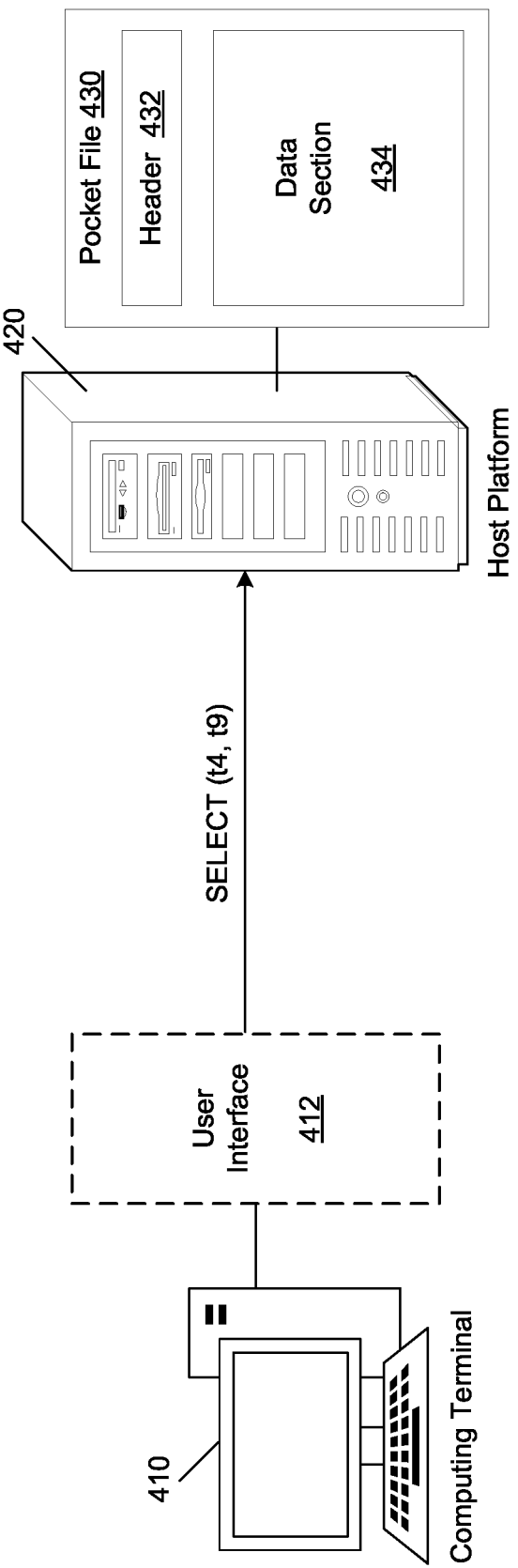

FIG. 4C illustrates a process 400C of the computing terminal 410 receiving the header 432 from the host platform, and selecting content to be played from the data section 434 of the pocket file 430. For example, the user interface 412 may display the index included in the header 432 downloaded from the host platform 420. The index may include information about which intervals of time correspond to which portions of the video. The user interface 412 may include identifiers of the types of content stored at each interval (e.g., lidar, GPS, camera, speed, etc.) which can be used by the user when deciding which content to play. The user may enter commands into the user interface 412 and select one or more intervals of time to be played from the data section 434 of the pocket file 430.

Figure 4D:
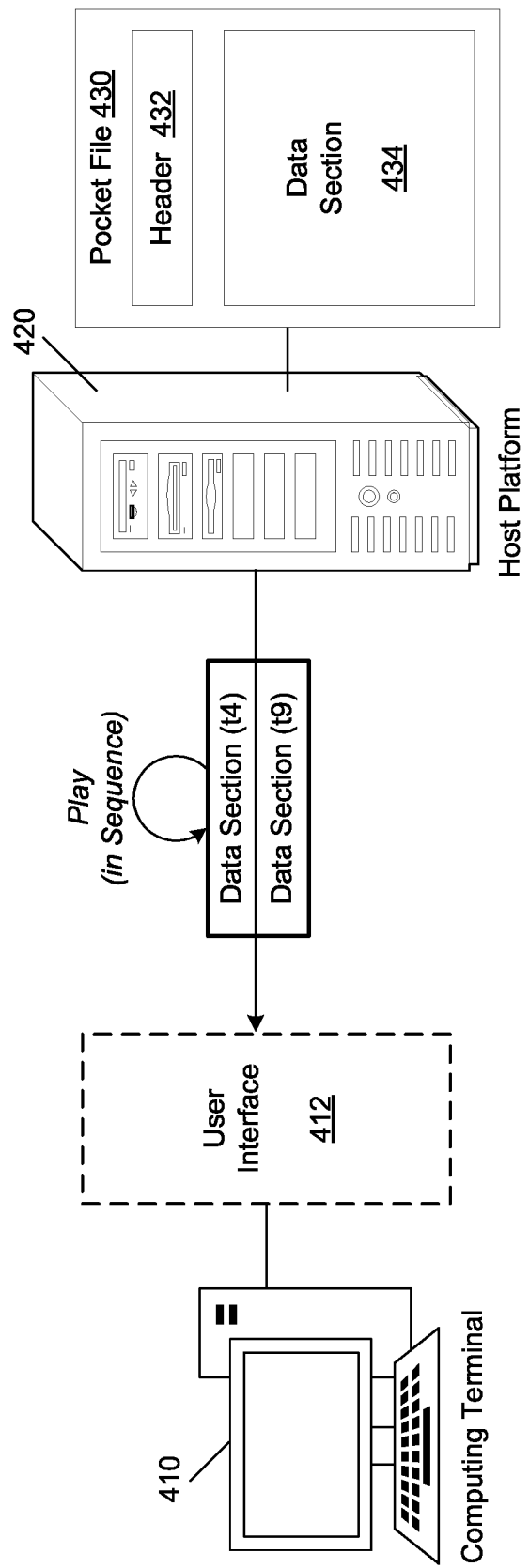

Referring now to FIG. 4D, illustrates a process 400D of the host platform 420 downloading select content from the pocket file 430 to the computing terminal 410 in response to the selection performed in the process of FIG. 4C. Here, the host platform 420 may receive identifiers that can be used to pull content from the data section 434 based on the index stored in the header 432. Here, the identifiers received from the computing terminal 410 may include timing identifiers (intervals of time) that the user wishes to play. In response, the host platform 420 may identify which byte locations within the data section 434 contain the corresponding data to be played at those intervals of time, and selectively download only the data stored at those identified byte locations without downloading the data section 434 of the pocket file 430.

On the user's end, the computing terminal 410 may play the intervals of time of time-based data in sequence even if the two intervals of time are not in sequence in the original time-based data. In the example of FIG. 4D, time-based data from a fourth interval (e.g., a fourth second) of time is played in sequence with time-based data from a ninth interval (e.g., a ninth second). Here, the computing terminal 410 may request that the host platform 420 play only the content from the fourth and the ninth second of the time-based data stored within the pocket file 430. In response, the host platform 420 may download only the data needed for playing the fourth and ninth seconds of the content while not downloading intervening intervals of time for other content such as the time-based data from a first to third intervals of time in the video, the time-based data from a fifth to the eighth intervals of time of the video, and the time-based data from any intervals of time after the ninth interval of time. If the computing terminal 410 were a vehicle, the vehicle may simulate the content from the file in a selective manner using the process described herein. It should also be appreciated that ranges of data (time intervals) may be requested including a starting point and a stopping point of time.

Figure 5:
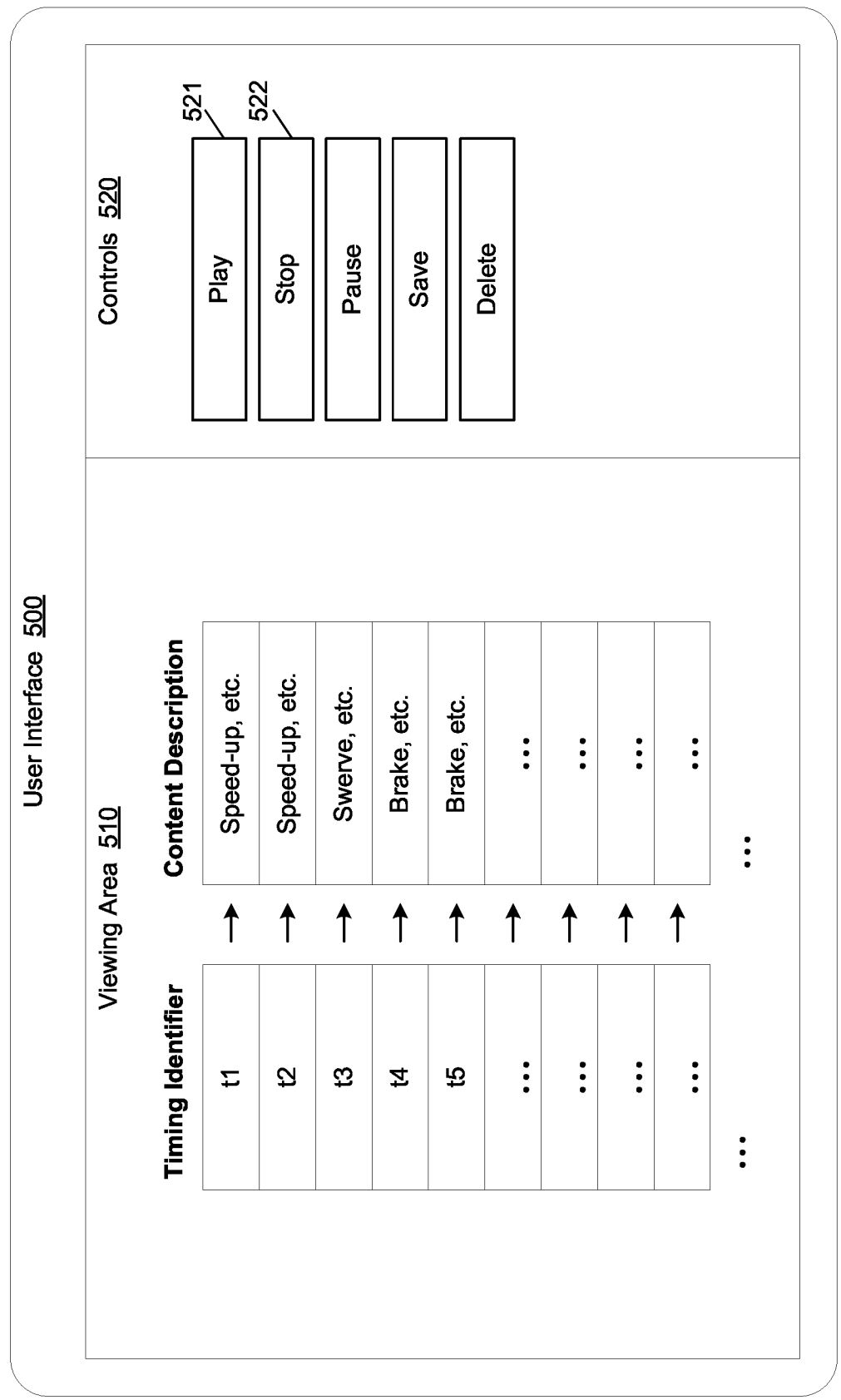
FIG. 5 is a diagram illustrating a user interface for use in streaming content in accordance with example embodiments.

FIG. 5 illustrates a user interface 500 that corresponds to the user interface 412 shown in the examples of FIGS. 4A-4D. Referring to FIG. 5, the user interface 500 includes a viewing area 510 and a control section 520 with commands 521, 522, etc., for controlling and making selections based on data displayed within the viewing area 510. In the example of FIG. 5, the viewing area 510 is displaying an example of an index that may be downloaded from a header of a pocket file and converted into a visual format that is understandable to the viewer (person) viewing the user interface 500.

In this example, the index is a human-readable version which includes intervals of time mapped to content descriptions of the content that is stored within a data section of the pocket file at the corresponding intervals of time. The content descriptions may include an identifier of a topic of the data such as an identifier of a system that posted a corresponding data message with the content. As an example, the topics may include, but are not limited to, GPS, engine, brake system, accelerator, control system, planner, etc. The topics can be used to give the user an understanding of the content that is stored at each interval. For example, the data stored in the data section may correspond to messages that were published or otherwise posted by various systems in a vehicle at the respective intervals of time. The topics may be used as the content descriptions. Here, the topics often identify the type of system that posted the message thereby enabling an easy understanding of the type of content stored at that interval in the video.

Figure 6A:
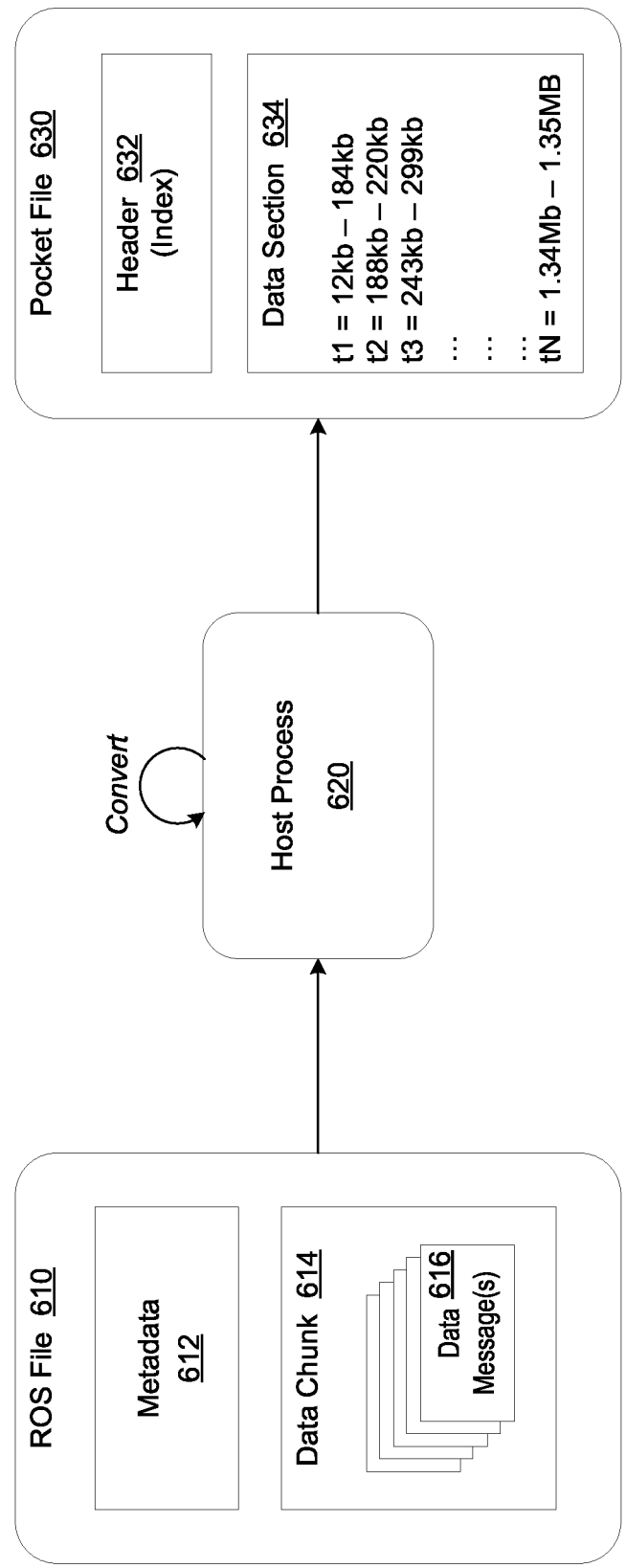
FIGS. 6A-6B are diagrams illustrating a process of converting a ROS file into a pocket file in accordance with example embodiments.
Figure 6B:
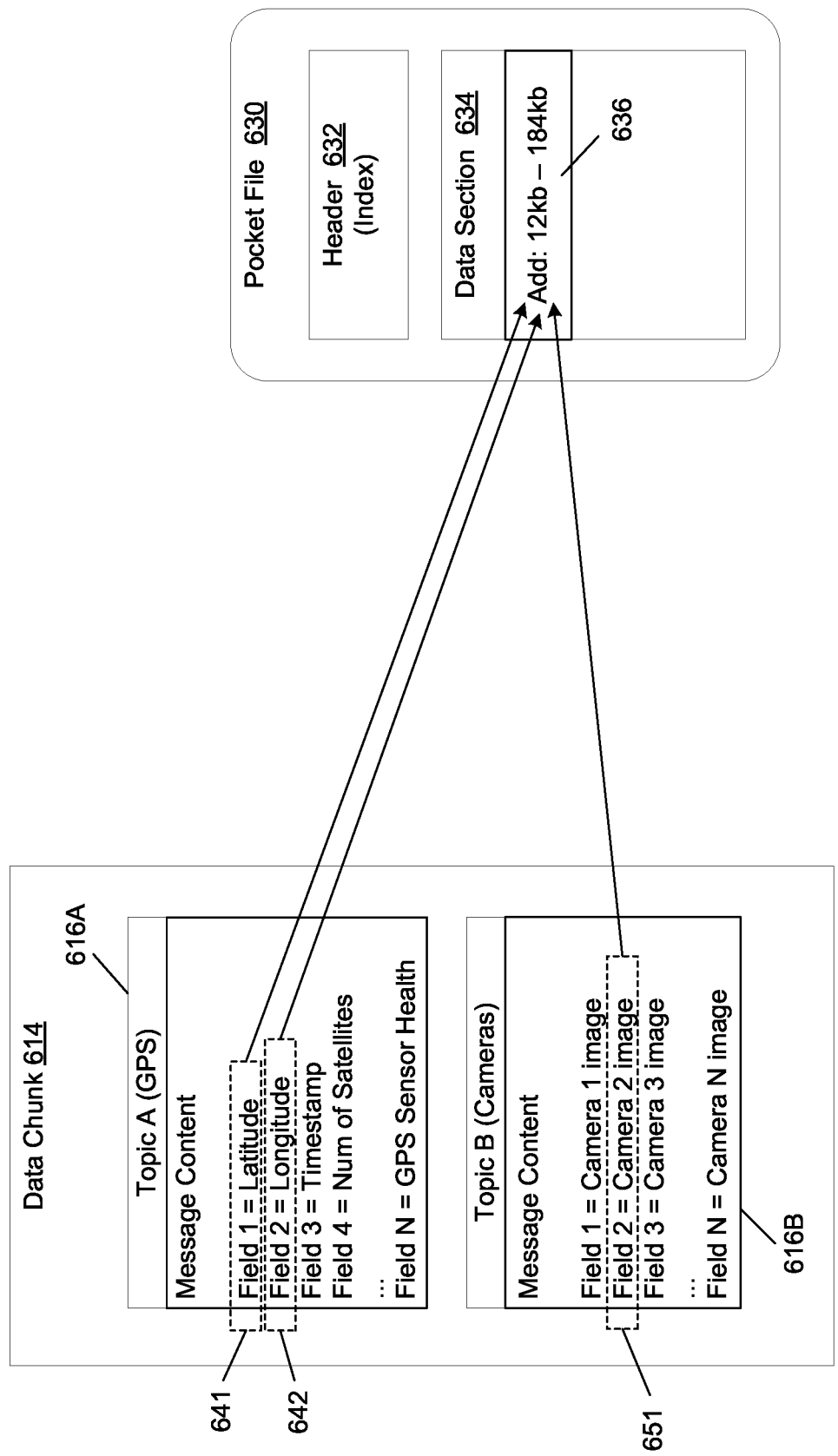

FIGS. 6A-6B illustrate a process of converting a ROS file into a pocket file in accordance with example embodiments. For example, referring to FIG. 6A, illustrated is a process 600 of converting a robotic operating system (ROS) file into a pocket file 630 according to various embodiments. Referring to FIG. 6A, a host process 620 may ingest the ROS file 610 in its original form. The ROS file 610 may include a metadata section 612 and a data chunk 614 which may include encoded data from various systems of a vehicle including a GPS system, a braking system, an engine, an accelerator, a planning and route guidance system, and the like. The data chunk 614 within the ROS file 610 may include timing information therein, however, there is no way for the system to jump directly between non-intervening segments of time-based data based on the ROS file 610. Therefore, the entire file/data must be loaded and played even if the user only wants to play a small subset of the time-based data stored therein.

The data chunk 614 may include messages 616 of data which are published by the different systems of a vehicle. The messages 616 may be published to different topics which can be identified from the messages 616 stored within the data chunk 614. The host process 620 may use these messages 616, and the topics associated therewith to understand the content that is stored in each of the messages. Furthermore, the host process 620 may identify timestamps within the messages 616, such as a starting timestamp of data capture, a stopping timestamp of data capture, and the like. The timestamps and the topics of the messages 616 may be used to build an index which is stored in a header 632 of the pocket file 630.

For example, the messages 616 stored in the data chunk 614 may be parsed and converted into subsets of data (or pockets) based on time. For example, each of the messages posted at the same interval of time may be stored together in a pocket of data within a data section 634 of the pocket file 630. Furthermore, each interval of time and the corresponding data associated therewith can be stored at a different respective byte location of the data section 634 of the pocket file 630. Furthermore, the corresponding byte locations and the intervals of time may be mapped to each other and stored within an index in the header 632 of the pocket file 630. The header 632 may also include other data attributes including an identifier of the header size, an identifier of each pocket size, identifiers of schemas of the messages 616, identifiers of the topics associated with the messages 616, and the like. The header 632 (and the index included therein) may be encoded in CBOR. In this example, the message schemas are present and help an end-user (e.g., a client application, etc.) understand the meaning of each message and decipher the data within the messages. For example, the messages can store fields of values and the client application can understand which fields hold which values based on the schema(s).

FIG. 6B illustrates a process 640 of extracting data from the data chunk 614 of the ROS file 610 in FIG. 6A, and loading it into a pocket 636 of the data section 634 of the pocket file 630. The pocket 636 may include a subset of bytes within the data section 634 which may be stored in the index and mapped to an interval of time corresponding to the time interval of a video from which the content is from. In this example, the data pulled from the data chunk 614 may be selectively pulled based on field names. For example, a message 616A in the data chunk 614 may be posted by a GPS system of a vehicle. Here, a topic of the message may be identified therefrom and used to categorize the content. The host process 620 may be configured (e.g., by a user via the user interface 500, etc.) to pull specific fields of data from the data messages while leaving other fields of data without bringing them over to the pocket file 630.

For example, the host process 620 may select fields 641 and 642 from the messages 616 while excluding the remaining fields from the message. Thus, only the data from fields 641 and 642 may be pulled into the pocket file 630. Likewise, only a field 651 from a data message 616B can be pulled and put into the pocket file 630. Here, both of these messages 616A and 616B are posted at the same time interval which can be identified from the timestamps of the messages 616A and 616B. The host process 620 may put the content from these messages in the same pocket 636 with the data section 634 of the pocket file 630.

Figure 7:
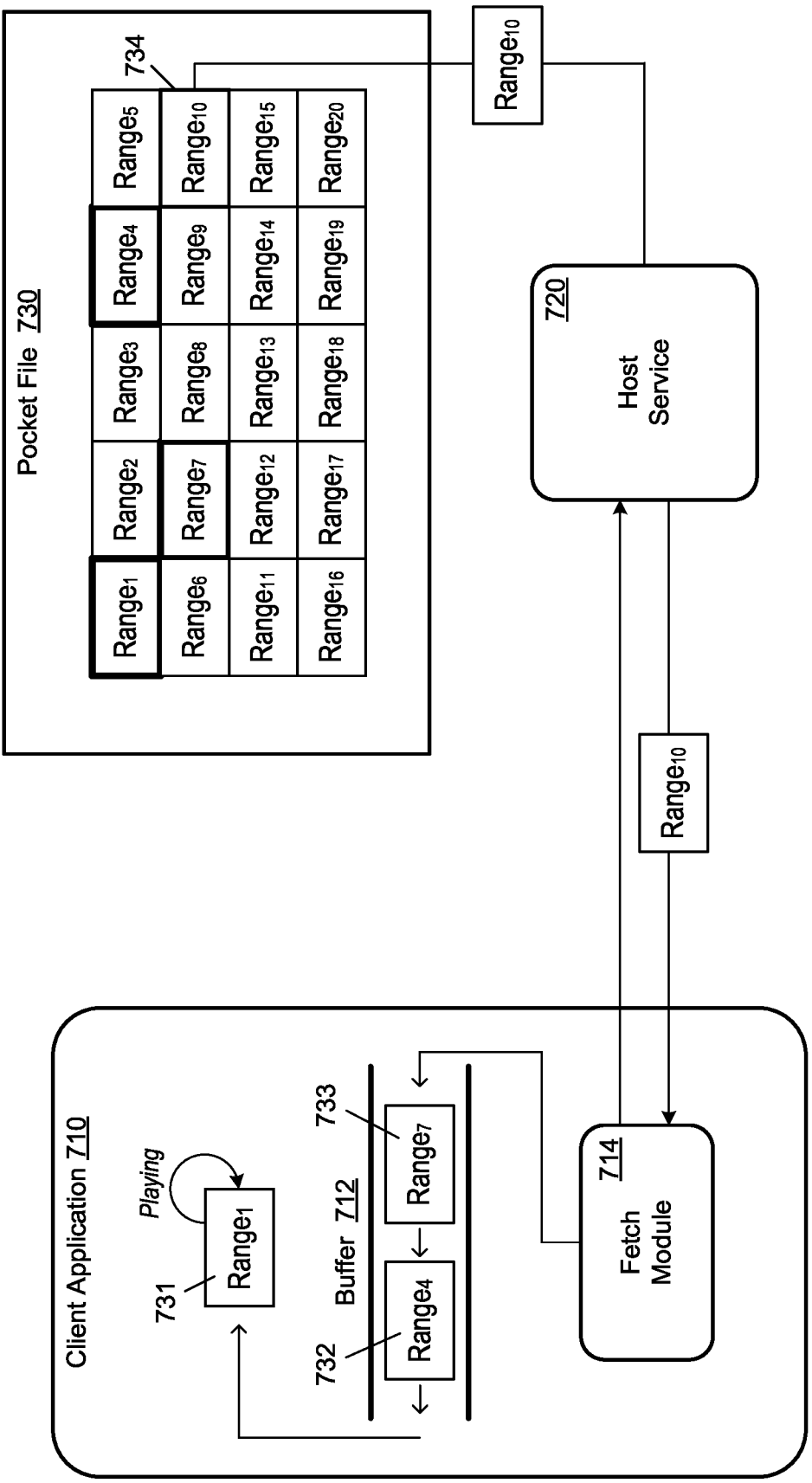
FIG. 7 is a diagram illustrating a process of loading time-based data from a server via a client application in accordance with example embodiments.

FIG. 7 illustrates a process 700 of loading time-based data from a server via a client application in accordance with example embodiments. Referring to FIG. 7, a client application 710 may be installed on a device such as a laptop, a desktop computer, a mobile device, a server, a vehicle, and the like. The device may be network-connected to a server. In this example, the client application 710 is playing data stored on a file 730 that is hosted on the server. The server includes a host service 720 that can receive requests for data from the client application 710 (e.g., from the fetch module 714, etc.). For example, the fetch module 714 may send HTTP range requests to the host service 720 with requests for intervals of data from the file 730. In this example, the file 730 is referred to as a pocket file that includes a plurality of "pockets" or chunks of data that can be selectively extracted and delivered to the client application 710 by the host service 720.

According to various embodiments, the client application 710 may include a buffer 712 that enables the client application 710 to temporarily hold chunks of data 732 and 733 while simultaneously playing a chunk of data 731 which have been pulled from the file 730 via the host service 720. In this example, the chunk of data 731 corresponds to a first interval of time in the file 730, the chunk of data 732 corresponds to the fourth interval of time in the file 730, the chunk of data 733 corresponds to the seventh interval of time in the file 730, and the chunk of data 734 corresponds to the tenth interval of time in the file 730.

Using the buffer 712, the client application 710 can simultaneously fetch and store additional chunks of data that are not yet ready to be run/played ensuring a seamless play of the chunks of data even though the chunks of data are from non-consecutive intervals of time within the time-based data stored in the file 730. Each chunk of data 731, 732, 733, and 734 corresponds to a non-consecutive chunk of content from non-consecutive intervals of time in the file 730. Thus, the client application 710 can selectively play intervals of time corresponding to non-consecutive intervals of time from a file in sequential/consecutive order.

FIG. 8 illustrates a method 800 of selectively streaming content from a binary file in accordance with an example embodiment. For example, the method 800 may be performed by a web server, a content delivery system/network, a cloud platform, an on-premises server, and the like. Referring to FIG. 8, in 810, the method may include storing a plurality of binary files. The binary files are referred to herein as "pocket" files in which pockets of data can be selectively streamed without having to open and/or download the entire pocket file. In 820, the method may include establishing a network communication session between the computing system and a computing terminal via a network. For example, an authentication or other handshake may be performed.

In 830, the method may include receiving identifiers of one or more intervals of time from the computing terminal via the network communication session. As an example, the method may include receiving an HTTP range request from a client application running on the computing terminal which asks the server to only send a portion of an HTTP message back to a client application. In 840, the method may include identifying a subset of data within a data section of a binary file stored in memory which is mapped to the identifiers of the one or more intervals of time (e.g., ranges of time in the HTTP rang request, etc.) based on an index within the binary file. In 850, the method may include transmitting a stream including the identified subset of data to the computing terminal via the network communication session. In some embodiments, the index may include a mapping between a plurality of intervals of time and a plurality of byte locations within the data section of the binary file where data objects captured at the plurality of intervals of time are stored, respectively.

According to various embodiments, the data section of the binary file may include a video stored therein, and the identifying may include identifying a subset of the video to play back based on the received identifiers of the one or more intervals of time. In some embodiments, the identifiers may include identifiers of two non-consecutive intervals of time, and the method further comprises jumping over one or more intermediate intervals of time within the video that are in between the two non-consecutive intervals of time, when playing the video. In some embodiments, the receiving may include receiving a streaming request with the identifiers of the one or more intervals of time from the computing terminal, and in response, streaming multimedia content from only one or more pockets of data within the data section of the binary file.

In some embodiments, the method may further include transmitting the index of the binary file to the computing terminal prior to receiving the identifiers of one or more intervals of time. In some embodiments, the method may further include converting a robotic operating system (ROS) file with multimedia content stored therein into a binary file which includes an index associated therewith and the multimedia content stored within a data section of the binary file. In some embodiments, the index may include a plurality of intervals of time corresponding to a plurality of points of time in the multimedia content, and the index comprises a mapping between the plurality of intervals of time to a plurality of pockets of multimedia content within the data section, respectively. \

As will be appreciated based on the foregoing specification, the above-described examples of the disclosure may be implemented using computer programming or engineering techniques including computer software, firmware, hardware or any combination or subset thereof. Any such resulting program, having computer-readable code, may be embodied or provided within one or more non transitory computer-readable media, thereby making a computer program product, i.e., an article of manufacture, according to the discussed examples of the disclosure. For example, the non-transitory computer-readable media may be, but is not limited to, a fixed drive, diskette, optical disk, magnetic tape, flash memory, external drive, semiconductor memory such as read-only memory (ROM), random-access memory (RAM), and the like. The article of manufacture containing the computer code may be made and/or used by executing the code directly from one medium, by copying the code from one medium to another medium, or by transmitting the code over a network.

The computer programs (also referred to as programs, software, software applications, "apps", or code) may include machine instructions for a programmable processor, and may be implemented in a high-level procedural and/or object-oriented programming language, and/or in assembly/machine language. As used herein, the terms "machine-readable medium" and "computer-readable medium" refer to any computer program product, apparatus, cloud storage, and/or device (e.g., magnetic discs, optical disks, memory, programmable logic devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal that may be used to provide machine instructions and/or any other kind of data to a programmable processor.

The above descriptions and illustrations of processes herein should not be considered to imply a fixed order for performing the process steps. Rather, the process steps may be performed in any order that is practicable, including simultaneous performance of at least some steps. Although the disclosure has been described in connection with specific examples, it should be understood that various changes, substitutions, and alterations apparent to those skilled in the art can be made to the disclosed embodiments without departing from the spirit and scope of the disclosure as set forth in the appended claims.

What is claimed is:

1. A computing system comprising:
   a memory configured to store a plurality of binary files; and
   a processor configured to:
   establish a network communication session between the computing system and a computing terminal via a network;
   receive identifiers of one or more intervals of time from the computing terminal via the network communication session;
   identify a subset of data within a data section of a binary file stored in memory which is mapped to the identifiers of the one or more intervals of time based on an index within the binary file; and
   transmit a stream including the identified subset of data to the computing terminal via the network communication session,
   wherein the processor is further configured to convert a robotic operating system (ROS) file with multimedia content stored therein into a binary file which includes an index associated therewith and the multimedia content stored within a data section of the binary file.

2. The computing system of claim 1, wherein the index comprises a mapping between a plurality of intervals of time and a plurality of byte locations within the data section of the binary file where data objects captured at the plurality of intervals of time are stored, respectively.

3. The computing system of claim 1, wherein the data section comprises a video stored therein, and the processor is configured to identify a subset of the video to playback based on the received identifiers of the one or more intervals of time.

4. The computing system of claim 3, wherein the identifiers comprise identifiers of two non-consecutive intervals of time, and the processor is configured to jump over one or more intermediate intervals of time within the video that are in between the two non-consecutive intervals of time, when playing the video.

5. The computing system of claim 1, wherein the processor is configured to receive a streaming request with the identifiers of the one or more intervals of time, and in response, stream multimedia content from only one or more pockets of data within the data section of the binary file.

6. The computing system of claim 1, wherein the processor is configured to transmit the index of the binary file to the computing terminal prior to receiving the identifiers of one or more intervals of time.

7. The computing system of claim 1, wherein the index comprises a plurality of intervals of time corresponding to a plurality of points of time in the multimedia content, and the index comprises a mapping between the plurality of intervals of time to a plurality of pockets of multimedia content within the data section, respectively.

8. A method comprising:
   storing a plurality of binary files;
   establishing a network communication session between a computing system and a computing terminal via a network;
   receiving identifiers of one or more intervals of time from the computing terminal via the network communication session;
   identifying a subset of data within a data section of a binary file stored in memory which is mapped to the identifiers of the one or more intervals of time based on an index within the binary file;
   transmitting a stream including the identified subset of data to the computing terminal via the network communication session; and
   converting a robotic operating system (ROS) file with multimedia content stored therein into a binary file which includes an index associated therewith and the multimedia content stored within a data section of the binary file.

9. The method of claim 8, wherein the index comprises a mapping between a plurality of intervals of time and a plurality of byte locations within the data section of the binary file where data objects captured at the plurality of intervals of time are stored, respectively.

10. The method of claim 8, wherein the data section comprises a video stored therein, and the identifying comprises identifying a subset of the video to playback based on the received identifiers of the one or more intervals of time.

11. The method of claim 10, wherein the identifiers comprise identifiers of two non-consecutive intervals of time, and the method further comprises jumping over one or more intermediate intervals of time within the video that are in between the two non-consecutive intervals of time, when playing the video.

12. The method of claim 8, wherein the receiving comprises receiving a streaming request with the identifiers of the one or more intervals of time from the computing terminal, and in response, streaming multimedia content from only one or more pockets of data within the data section of the binary file.

13. The method of claim 8, wherein the method further comprises transmitting the index of the binary file to the computing terminal prior to receiving the identifiers of one or more intervals of time.

14. The method of claim 8, wherein the index comprises a plurality of intervals of time corresponding to a plurality of points of time in the multimedia content, and the index comprises a mapping between the plurality of intervals of time to a plurality of pockets of multimedia content within the data section, respectively.

15. A non-transitory computer-readable medium comprising instructions which when executed by a processor cause a computer to perform a method comprising:
   storing a plurality of binary files;
   establishing a network communication session between a computing system and a computing terminal via a network;
   receiving identifiers of one or more intervals of time from the computing terminal via the network communication session;
   identifying a subset of data within a data section of a binary file stored in memory which is mapped to the identifiers of the one or more intervals of time based on an index within the binary file;

transmitting a stream including the identified subset of data to the computing terminal via the network communication session; and converting a robotic operating system (ROS) file with multimedia content stored therein into a binary file which includes an index associated therewith and the multimedia content stored within a data section of the binary file.

16. The non-transitory computer-readable medium of claim 15, wherein the index comprises a mapping between a plurality of intervals of time and a plurality of byte locations within the data section of the binary file where data objects captured at the plurality of intervals of time are stored, respectively.

17. The non-transitory computer-readable medium of claim 15, wherein the data section comprises a video stored therein, and the identifying comprises identifying a subset of the video to playback based on the received identifiers of the one or more intervals of time.

18. The non-transitory computer-readable medium of claim 17, wherein the identifiers comprise identifiers of two non-consecutive intervals of time, and the method further comprises jumping over one or more intermediate intervals of time within the video that are in between the two non-consecutive intervals of time, when playing the video.

* * * * *